United States Patent
Lejdegärd

[15] 3,682,038
[45] Aug. 8, 1972

[54] SELF-TAPPING SCREW WITH DRILL MEANS

[72] Inventor: Sixten H. Lejdegärd, Hallstahammar, Sweden

[73] Assignee: Bultfabriks Aktiebolaget, Hallstahammar, Sweden

[22] Filed: Oct. 22, 1969

[21] Appl. No.: 868,419

[30] Foreign Application Priority Data

Oct. 23, 1968 Sweden ..................14347/68
Oct. 17, 1969 Sweden ....................4312/69

[52] U.S. Cl..........................................85/41, 10/10
[51] Int. Cl..............................................F16b 25/00
[58] Field of Search............85/41.47; 77/67; 145/130

[56] References Cited

UNITED STATES PATENTS

| 2,347,360 | 4/1944 | Muenchinger | 85/47 |
| 3,045,523 | 7/1962 | Reed | 85/47 |
| 3,093,028 | 6/1963 | Mathie | 85/41 |
| 3,094,894 | 6/1963 | Broberg | 85/47 |

FOREIGN PATENTS OR APPLICATIONS

| 633,938 | 12/1949 | Great Britain | 85/47 |
| 1,475,049 | 5/1969 | Germany | 85/41 |
| 639,198 | 5/1962 | Italy | 85/47 |
| 50,995 | 1/1910 | Switzerland | 85/41 |

*Primary Examiner*—Marion Parsons, Jr.
*Attorney*—Robert E. Burns and Emmanuel J. Lobato

[57] ABSTRACT

Disclosed herein is a self-tapping screw having a drill tip for boring an opening in a work piece, wherein the drill tip comprises an axial section of cone attached at its base portion to the shank of the screw. The conical section has a cutting edge along a conical surface thereof, such cutting edge being disposed in a plane which includes the axis of the screw shank, and a chute extending from a position adjacent the cutting edge to a position at the screw shank so that chips of the workpiece are carried out of the bored opening along the path of the chute.

12 Claims, 6 Drawing Figures

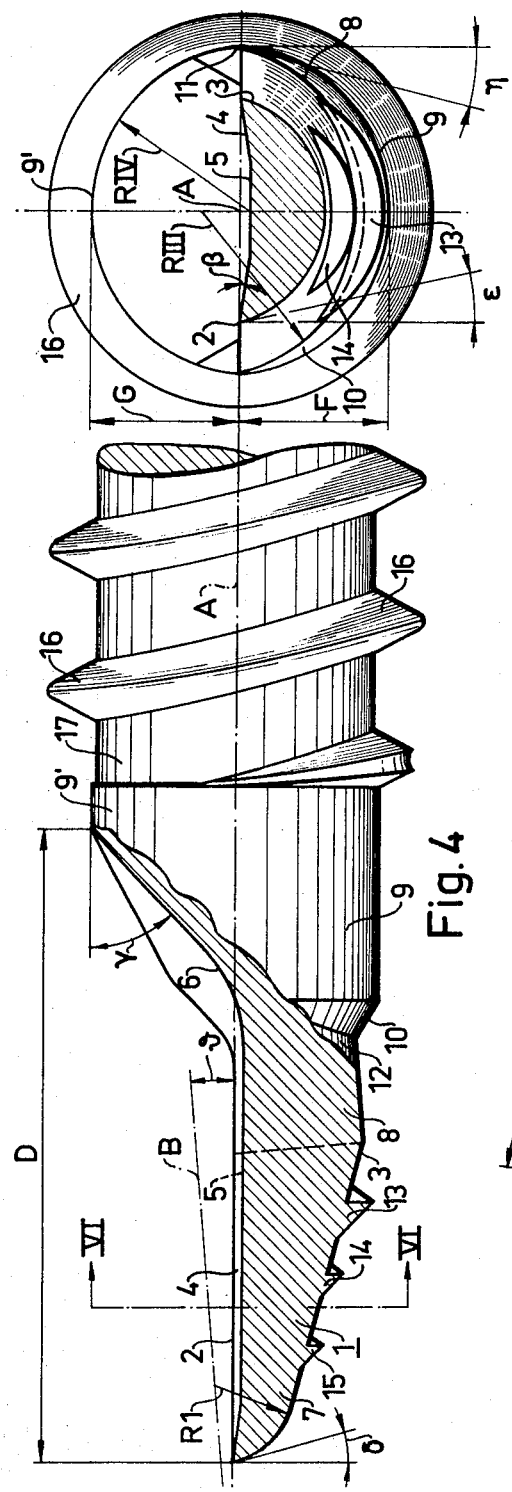

SELF-TAPPING SCREW WITH DRILL MEANS

Screws provided with means for drilling the hole in which they shall be threaded into may be divided mainly in two groups as to the method of manufacturing thereof. The first group includes screws at which the drill is made by cutting machining. The second group includes screws at which the drill is shaped through plastic machining.

Screws made in accordance with the first group have relatively good drilling properties but are expensive in manufacture. Screws made in accordance with the other group on the contrary are simple to manufacture and are relatively cheaper. The problem in this case, however, is to achieve a drill having sharp and correctly shaped cutting edges and suitable angles of clearance and means for facilitating the feeding of the drill into a work piece.

The object of the present invention is to obtain a solution of the last mentioned problems by a very suitable shaping of the drill and attached portions of the screw which makes the same suitable for cheap duplicate production and at the same time shows good drilling properties.

The characterizing features of the invention are set forth in the enclosed claims.

The invention is described below with reference to the enclosed drawings in which;

FIG. 4 shows the drill of a further embodiment seen from one side.

FIG. 5 shows the last mentioned embodiment in a vertical projection.

FIG. 6 shows a section along the line VI—VI in FIG. 4.

In order to give a clear picture of the invention in practice, angle figures and dimension figures are mentioned in the following description of the embodiments shown, but such figures are given by way of example only.

Figure 1:
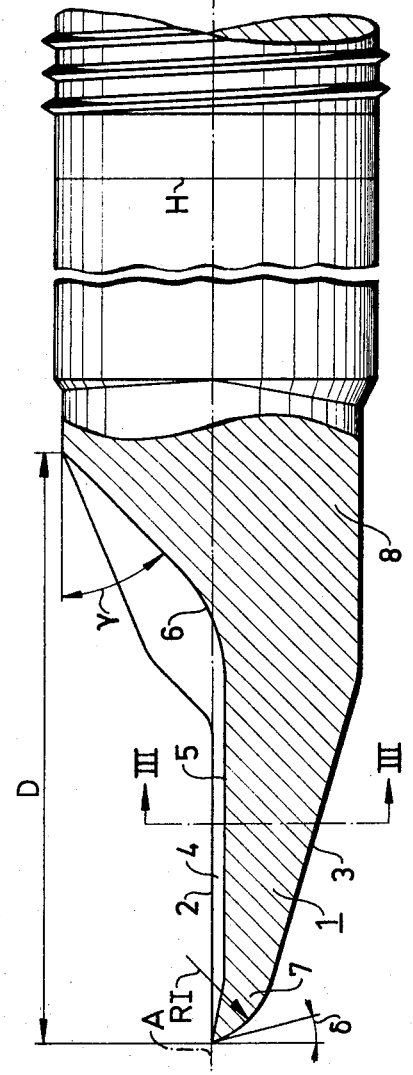
FIG. 1 shows the drill of an embodiment of a screw in accordance with the present invention seen from one side.

The drill of the screw shown in FIG. 1 is constituted by a front portion 1 in the form of a cone longitudinally cut, having a cone angle $\alpha$ of 33° and the cutting plane located somewhat displaced in relation to the axis B of the cone parallelly however with the main axis A of the screw. The edges obtained at the cutting plane along the envelope surface 3 of the cone constitute the cutting edges 2 of the drill. At rotation of the screw around the main axis A of course only one of the cutting edges 2 is a working edge. The portion between the cutting edges 2 has a spoonlike shape and chip surfaces 4 run parallelly with the edges, said surfaces making an angle $\beta$ with the cutting plane of the cone. The chip surfaces 4 are in turn bounded to an essentially triangularly shaped chip collecting plane surface 5 which is located somewhat excentrically displaced in relation to the main axis A of the screw. The plane surface 5 is transcended through a curved portion into a chip groove 6 inclined to the screw axis A with an angle $\gamma$ of about 45°. The conical front portion 1 is at its free end shaped to a point having a curved portion 7 and is attached to the threaded portion of the screw by a portion constituted by two semicylindrical portions 8, 9 having different axes. The chip groove 6 opens in a portion of the envelope surface of the semicylindrical portion 9.

Figure 3:
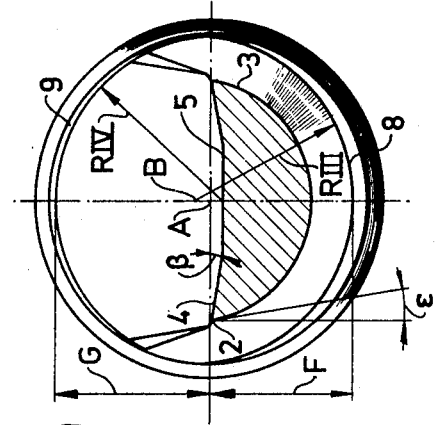
FIG. 3 shows a section along the line III—III in FIG. 1.

In order to achieve a suitable clearance angle; i.e., the angle here designated $\delta$ constituted between the said cutting plane of the cone and a plane perpendicularly to the main axis A of the screw at the curved end portion 7, the radius RI of said end portion is chosen to have a length of 0.67 mm having its center located such that the angle $\delta$ is about 14.5°. The said figures are of course valid for the case in which the cone angle $\alpha$ is 33°, see FIG. 2. The second cone top radius RII apparent from FIG. 2, has its center located on the main axis A of the screw and is chosen to a value of 0.65 mm, the width C of the adjacent portion of the chip surfaces is 0.5 mm. The axis of the semicylindrical portions 8,9 and the cone axis B, coinciding with the axis of the portion 8 as apparent from FIG. 3, are eccentrically located in relation to the main axis A of the screw having an eccentricity of about 5 percent of the outer diameter of the screw in order to obtain a clearance at the cylindrical portion and a clearance angle $\epsilon$ of about 9° at the cutting edge 2, which is constituted between the envelope surface 3 of the cone and the adjacent chip surfaces 4. As above mentioned the chip surfaces 4 are arranged at an incline relative to a plane through the cutting edges 2 and the main axis A of the screw. In the example shown the chip angle $\beta$ is 10°. The radius RIII of the base portion of the cone and adjacent semicylindrical portion 8 is chosen to be 1.73 mm as measured from the cone axis center B, see FIG. 3. The semicylindrical portion 9 including the chip groove 6 has a radius RIV, which in this case is equal to 1.40 mm as measured from the plane surface 5. As apparent an effective clearance is achieved as to the chip cutting drill portions in relation to the core of the screw. The distance D between the point of the screw and the rear end of the chip groove 6 is in the present case 5.20 mm. The distance E between the point of the screw and the rear end of the chip surfaces 4 is 3.15 mm. The distance F between the main screw axis A and the outermost portion of the portion 8 measured in a direction perpendicular to the cone cutting plane is 1.25 mm. and the distance F between the main axis A of the screw and the outermost portion of the portion 9 in a direction perpendicular to the cone cutting plane is 1.35 mm. The screw core diameter H is 2.84 mm. The length measure figures require no further explanation but contribute to the understanding of the construction in question.

Tests in practice have given the results that the cone angle $\alpha$ may vary between 15° and 40° and the clearance angle $\delta$ between 8° and 15°. Further it has been proved that the clearance angle $\epsilon$ may be varied between 5° and 15° and chip angle $\beta$ between 8° and 25°. Furthermore, it is pointed out that a variation of the width C of the chip surfaces 4 between 0.3 mm and 1 mm has given good results in an arrangement having the general dimensions described above. The slanting angle $\gamma$ of the chip groove 6 relative to a plane parallel with the main axis A of the screw may be varied between about 20°–60° and preferably between 40° and 60°. The figures above mentioned are not in any way to be considered as definite limit values. Said figures have been achieved during trials hitherto made, and variations within wide limits can thus be included within the scope of the present invention.

In case it is intended to use the screw in accordance with the present invention for drilling of holes in relatively thick work pieces, the chip groove 6 ought to be extended towards the threaded portion of the screw or into said threaded portion.

Figure 2:
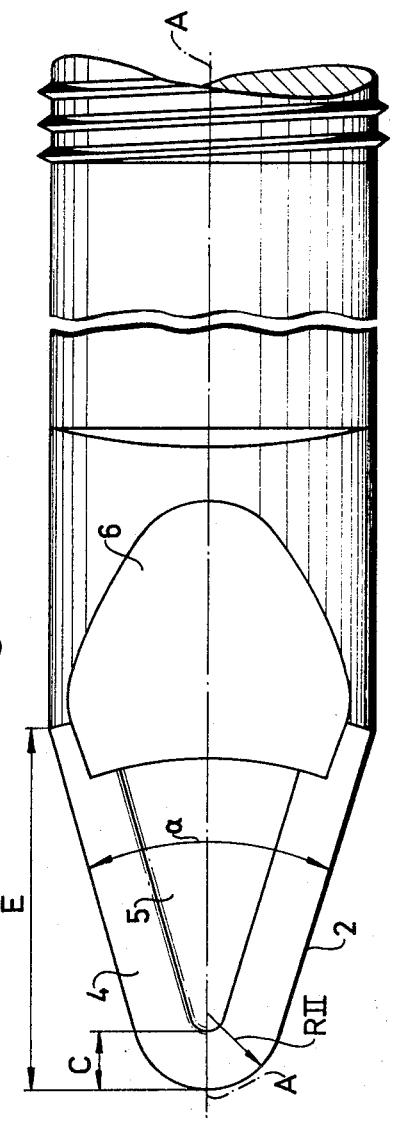
FIG. 2 shows the same drill seen in a vertical projection.

The screw drill shown in FIGS. 4–6 consists of the screw of FIGS. 1–3 of a front portion 1 in the shape having a cone longitudinally cut having a cone angle $\alpha$ of about 40° and the cutting plane somewhat displaced in relation to the cone axis B which in this case is inclined by an angle $v$ of about 5° to the main axis A of the screw. The edges constituted at the cutting plane along the envelope surface 3 of the cone 1 constitute the cutting edges 2. When drilling, i.e., upon rotation of the screw around its main axis A, only one of said edges 2 is a cutting edge and the other one is present only by symmetrical reasons as in the embodiment in accordance with FIGS. 1–3. The portion between the cutting edges 2 has a spoonlike shape and chip surfaces 4 run along and parallel with the edges, which surfaces make an angle $\beta$ with the cutting plane of the cone. Because of the angle between the cone axis B, and the axis A the angle $\beta$ i.e., the chip angle, becomes more favorable than in the case of parallel axes. The chip surfaces 4 are in turn bounded to an essentially triangularly shaped plane surface 5 which is somewhat eccentrically displaced relatively to the main axis A of the screw. The plane surface 5 is through a curved portion transcended into an inclined chip groove 6 making an angle $\gamma$ of about 40°–60° with the main axis of the screw. The cone 1 has a curved portion 7 at its free end which portion constitutes the point of the drill. The cone 1 is rearwardly attached to a semicylindrical portion 8 the axis of which coincides with the axis B of the cone. The semicylindrical portion 8 in turn is connected to a semicylindrical portion 9 through a conical connection portion 10. The semicylindrical portion 9 is diametrically bounded to an adjacent complementary semicylindrical portion 9'. The chip groove 6 opens into a surface portion of the envelope surface of the last mentioned semicylindrical portion 9'. As apparent from FIGS. 4 and 5 the chip surfaces 4 in this case end at portions 11 at the border between the conical front portion 1 and the semicylindrical portion 8.

In order to achieve a suitable clearance angle i.e., the angle here designated $\delta$, which is counted from a plane perpendicular to the screw axis A at the curved top portion 7 the radius RI of said top portion is chosen to have a length of 0.67 mm having its center located such that the angle $\delta$ amounts to about 20°. The figures above mentioned are of course valid for the case when the cone angle $\alpha$ is 40°, see FIG. 5. The other cone top radius RII, FIG. 5, is dependent on RI, FIG. 4, having its center at the main axis A of the screw. Said radius is in the present case 0.65 mm and adjacent portions of the chip surfaces 4 have a width C of 0.5 mm. The angle between the axis B and the axis A implies as above mentioned a considerable improvement as to the cutting conditions compared with previous constructions. The semicylindrical portion 8, the axis of which coincides with the axis B, constitutes at the envelope surface thereof a clearance portion 12 and shows a clearance angle $\eta$ of about 10°–20° at the cutting edge 2 constituted by the envelope surface 3 of the cone and adjacent chip surface 4. The clearance angle of the conical front portion 1 at the cutting edge 2 is designated $\epsilon$ which angle increases from the angle value of $\eta$ at the conical base portion in the direction towards the top portion of the cone. By such an arrangement the drilling resistance increases during the feeding into a work piece of the drill. In order to compensate the increasing drill resistance three thread cutting means 13, 14, 15 are arranged on the envelops surface 3 of the cone 1. Said thread cutting means extend part-moonshaped along said envelope surface. The thread cutting means are obliquely arranged having a pitch angle $\lambda$ which essentially, though not necessarily, corresponds to the pitch angle of the threads 16 arranged on the cylindrical core portion 17 of the screw which core portion is in turn attached to the semicylindrical portions 9 and 9'.

As above mentioned the chip surfaces 4 make an angle $\beta$ with the plane going through the cutting edges and the main axis A of the screw. In the example shown the chip angle $\beta$ is 10°. The radius RIII of the base portion of the cone 1 and adjacent semicylindrical portion 8 is chosen 1.43 mm, see FIG. 6. The semicylindrical portions 9 and 9' have both a radius RIV of 1.40 mm measured from two various center points located above and below the main axis A of the screw respectively, see FIG. 6.

The distances F and G, FIG. 6, between the outermost portions of the semicylindrical portions 9 and 9' and the main axis A of the screw measured perpendicular to the plane of the cutting edges 2 are 1.35 mm. The basic diameter H of the screw, see FIG. 3, i.e., the diametrical distance between the semicylindrical portions 9 and 9' border lines in the plane with the plane of the cutting edges 2, is 2.84 mm. The distance D between the top of the cone and the rear end of the chip groove 6 is in the present case 5.20 mm, and the distance E between the top of the cone and the rear end portions 11 of the chip surfaces 4 is 2.8 mm. Also as to the second embodiment the length figures require no further explanation but merely contribute to an understanding of the construction in question.

Trials in practice have proved as to the last mentioned embodiment that the cone angle $\alpha$ may be varied between 33° and 40° and the clearance angle $\eta$ between 10°–20°. Furthermore, it has been proved that the clearance angle $\delta$ ought to be 20° and the chip angle $\beta$ 10°, and as pointed out above with regard to FIGS. 1–3, a variation of the width C of the chip surfaces 4 between 0.3 mm and 1 mm gives good results in an arrangement having the general dimensions specified above. The slant angle $\gamma$ of the chip groove 6 relative to a plane parallel with the main axis A of the screw may be varied between 40° and 60°. The angle $\lambda$, i.e., the pitch angle of the part-moonshaped thread cutting means 13, 14, 15 may as above mentioned be equal to the pitch angle of the threads 16. However, trials have shown that said thread portions may have an angle of 90° to the main axis A of the screw. The essential task of said thread portions is to constitute an abutment for the drill in a work piece material at the feeding of the drill into the material during the drilling operation. At drilling of relatively thin sheet materials, i.e., sheet materials which have a thickness similar to or less than the distance between the thread cutting means 13 and the nearest portion of the thread 16, the pitch angle $\lambda$ may be determined by the material working conditions in question which angle deviates from that of the threads 16. Again, the above-mentioned values are not in any way to be considered as definite limit values, and variations within wide limits can therefore be considered within the scope of the present invention.

In the manufacture of a screw in accordance with the present invention a cold forming method may be used. A mould is thus preferably made of two mould halves the contact surfaces of which lie in the plane of the main axis A of the screw and in the plane of the cutting edges. The cold forming is carried out in accordance with principals known per se. During the moulding the threads 16 are not shaped but the semicylindrical portions 9 and 9' are allowed to extend through the hole portion which is to be provided with threads or transcend into a cylindrical portion having a diameter H. After finishing the moulding operation the mould halves are separated and the screw is inserted in a thread rolling machine for the shaping of the threads 16 shown. Through the thread rolling operation the core diameter of the screw becomes less than the measure H previously mentioned. This condition does not imply any drawback but only practical advantages at the threading of the screw into a work piece. A further advantage in connection with the threading of the screw into a work piece is that the longitudinal edge portions between the semicylindrical portions 9 and 9' having the diametrical measure H constitute guiding edges for the screw in the hole just drilled in the work piece.

When the intended use of a screw according to the second embodiment is for drilling relatively thick work pieces, the chip groove 6 has to be extended into the semicylindrical portion 9' towards the threaded portion of the screw and possibly into the threaded portion as mentioned in connection with the embodiment of FIGS. 1–3.

What is claimed is:

1. In a self-tapping screw having a threaded shank and a drill tip for feeding into a work piece, said drill tip being disposed at the penetrating end of the screw; an improvement wherein said drill tip comprises an axial segment of a cone; means interconnecting the base of said cone segment with the screw shank; said cone segment has a cutting edge defined at a conical wall thereof; said cutting edge is disposed in a plane which coincides with the axis of the screw; said drill tip has a chip surface having a said cutting edge as one boundary thereof and defining a rake angle with said plane; and chute surface means extending from said chip surface to said base of said cone segment for removal of chips; wherein said means interconnecting the cone segment base and the screw shank includes a pair of semicylindrical means joined together and having opposed semicylindrical surfaces wherein the axes of said cone segment and one of said semi-cylindrical means coincide and are eccentrically disposed with respect to the screw shank axis, thereby providing a clearance between a portion of said semicylindrical means and said work piece during drilling, and a clearance angle along said cutting edge which increases from the base of said cone segment, and wherein the extremity of said cone segment is disposed on the axis of said screw.

2. A self-tapping screw as set forth in claim 1, in which the axes of said cone segment and screw shank are spaced apart a distance corresponding to approximately 5 percent of the outer diameter of the screw.

3. A self-tapping screw as set forth in claim 1, in which said chute surface means extends along an outer wall of one of said semicylindrical means, said cone segment has a planar surface which forms said chip surface, and said planar surface extends into communication with said chute surface means, whereby chips produced by said cutting edge during drilling are carried successively from said cutting edge to said chip surface and then to said chute surface means.

4. A self-tapping screw as set forth in claim 1, in which the included angle of said cone segment has a magnitude between 15° and 40°, said clearance angle along said cutting edge has a magnitude between 5° and 15°, said rake angle of said cutting edge is between 8° and 25°, and said chute surface means defines an angle of between 20° and 50° with the screw axis.

5. A self-tapping screw as set forth in claim 1, in which the extremity of said cone section has a rounded shape defined by a radius of curvature, and in which said extremity defines an angle of clearance with a plane perpendicular to the screw axis.

6. In a self-tapping screw having a threaded shank and a drill tip for feeding into a work piece, said drill tip being disposed at the penetrating end of the screw; an improvement wherein said drill tip comprises an axial segment of a cone; means interconnecting the base of said cone segment with the screw shank; said cone segment has a cutting edge defined at a conical wall thereof; said cutting edge is disposed in a plane which coincides with the axis of the screw; said drill tip has a chip surface having said cutting edge as one boundary thereof and defining a rake angle with said plane; and chute surface means extending from said chip surface to said base of said cone segment for removal of chips; wherein said means interconnecting the cone segment base and the screw shank includes a first semicylindrical member integrally connected at its one end to said cone segment base and having its longitudinal axis disposed at an angle with said shank axis and parallel to the axis of said cone segment so that a longitudinally extending surface line of said first semicylindrical member diverges from said shank axis in the direction towards said cone segment.

7. A self-tapping screw as set forth in claim 6, further comprising second and third integrally connected semicylindrical members having parallel axes and being connected at one end to said screw shank, and a tapered member connected at its ends to the other end of said integral second and third members and to the other end of said first semicylindrical member.

8. A self-tapping screw as set forth in claim 7, in which said second and third semicylindrical members define a joining plane intermediate their axes, and wherein said screw axis and said cutting edge lies in said joining plane.

9. A self-tapping screw as set forth in claim 8, in which each of said second and third integrally connected members comprises less than half of a cylinder.

10. A self-tapping screw as set forth in claim 9, in which said chute surface means extends through said first semicylindrical member and said tapered member, and at least partially along an outer surface of one of said second and third members.

11. In a self-tapping screw having a threaded shank and a drill tip for feeding into a work piece, said drill tip being disposed at the penetrating end of the screw; an improvement wherein said drill tip comprises an axial segment of a cone; means interconnecting the base of said cone segment with the screw shank; said cone segment has its axis disposed angularly with the axis of the shank, and has a cutting edge defined at a conical wall thereof; said cutting edge is disposed in a plane which coincides with the axis of the screw; said drill tip has a chip surface having said cutting edge as one boundary thereof and defining a rake angle with said plane; and chute surface means extending from said chip surface to said base of said cone segment for removal of chips; wherein said means interconnecting the cone segment base and the screw shank includes a pair of integrally connected semicylindrical members having parallel axes and being interconnected between said screw shank and said cone segment, said pair of members each comprising less than half of a cylinder and defining a joining plane intermediate their axes, wherein said semicylindrical members provide an angle of clearance with said work piece during drilling at their edges which coincide with said joining plane, and wherein the included angle of said cone segment has a value between 33° and 40°, the angle between the screw and cone segment axes is approximately 5°, said angle of clearance is between 10° and 20°, and said clearance angle at said cutting edge increases from the base of said cone segment toward said extremity thereof.

12. In a self-tapping screw having a shank, and having a drill tip at a penetrating end thereof for feeding into a solid material, said drill tip having the shape of a cone segment including a cone angle and connected at its base to the screw shank and approximately forming a half-cone having its axis substantially in the longitudinal direction of the screw and at least one of the edges of said cone segment forming a cutting edge, an improvement wherein the axis of the shank lies in a plane generally defining one side of the cone segment; the axis of the cone segment is disposed at the opposite side of said plane in relation to the cone segment; said cutting edge is disposed in said plane; means defining a chip surface extend from the cutting edge and define a rake angle with said plane; means providing a chute extends from the extremity of the drill tip beyond the cone segment base for the removal of chips during operation and means defining a pair of semicylindrical surfaces interconnected between said shank and said cone segment, wherein the cone segment and one of said semicylindrical surfaces have coinciding axes of rotation for providing a first clearance angle at the semicylindrical surfaces and a second clearance angle along the cutting edges increasing from the base of the cone segment towards the extremity thereof at the screw axis.

* * * * *